(12) United States Patent
Wilson et al.

(10) Patent No.: US 11,306,619 B2
(45) Date of Patent: Apr. 19, 2022

(54) SEAL SUPPORT STRUCTURE FOR A CIRCUMFERENTIAL SEAL OF A GAS TURBINE ENGINE

(71) Applicant: United Technologies Corporation, Farmington, CT (US)

(72) Inventors: Ross Wilson, South Glastonbury, CT (US); Michael G. McCaffrey, Windsor, CT (US); John R. Farris, Bolton, CT (US); Theodore W. Hall, Berlin, CT (US); John J. Korzendorfer, Glastonbury, CT (US); Elizabeth F. Vinson, Wethersfield, CT (US); Jeffrey Michael Jacques, East Hartford, CT (US); John E. Paul, Portland, CT (US); Alan W. Stoner, Tullahoma, TN (US); Edwin Otero, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 192 days.

(21) Appl. No.: 16/455,093

(22) Filed: Jun. 27, 2019

(65) Prior Publication Data

US 2019/0331003 A1 Oct. 31, 2019

Related U.S. Application Data

(62) Division of application No. 14/921,533, filed on Oct. 23, 2015, now Pat. No. 10,443,450.
(Continued)

(51) Int. Cl.
*F01D 25/28* (2006.01)
*F01D 9/04* (2006.01)
(Continued)

(52) U.S. Cl.
CPC ............... *F01D 25/28* (2013.01); *F01D 5/22* (2013.01); *F01D 5/24* (2013.01); *F01D 5/26* (2013.01);
(Continued)

(58) Field of Classification Search
CPC .... F16J 15/00; F16J 15/16; F16J 15/50; F16J 15/52; F01D 25/28; F01D 25/285;
(Continued)

(56) References Cited

U.S. PATENT DOCUMENTS 3,319,929 A * 5/1967 Lawrence ............... F01D 25/04
415/119
7,094,020 B2 * 8/2006 Dong .................... F01D 11/001
415/112

(Continued)

FOREIGN PATENT DOCUMENTS

| EP | 1369552 A2 | 12/2003 |
|---|---|---|
| EP | 1640565 A2 | 3/2006 |
| WO | 2014143284 A1 | 9/2014 |

OTHER PUBLICATIONS

European Search Report for Application No. 15191396.9-1610; dated Feb. 29, 2016; 6 pgs.

*Primary Examiner* — Nathan Cumar
(74) *Attorney, Agent, or Firm* — Cantor Colburn LLP (57) ABSTRACT

A seal support structure is provided for a circumferential seal. In one embodiment, the seal support structure includes an engine support structure, a seal support, and a shoulder joining the engine support and seal support. The shoulder offsets the engine support from the seal support, and the shoulder and the seal support structure are configured to dampen vibration for the circumferential seal. The seal support structure may employ one or more dampening
(Continued)

elements or materials to interoperate with a seal support structure to dampen vibration to a seal system.

12 Claims, 8 Drawing Sheets

Related U.S. Application Data

(60) Provisional application No. 62/068,290, filed on Oct. 24, 2014.

(51) Int. Cl.
| | |
|---|---|
| *F01D 5/26* | (2006.01) |
| *F01D 9/02* | (2006.01) |
| *F01D 11/12* | (2006.01) |
| *F01D 5/24* | (2006.01) |
| *F01D 11/00* | (2006.01) |
| *F01D 25/24* | (2006.01) |
| *F01D 5/28* | (2006.01) |
| *F01D 5/22* | (2006.01) |
| *F16J 15/16* | (2006.01) |

(52) U.S. Cl.
CPC .............. *F01D 5/288* (2013.01); *F01D 9/02* (2013.01); *F01D 9/04* (2013.01); *F01D 11/00* (2013.01); *F01D 11/001* (2013.01); *F01D 11/127* (2013.01); *F01D 25/246* (2013.01); *F16J 15/16* (2013.01); *F05D 2220/32* (2013.01); *F05D 2240/55* (2013.01)

(58) Field of Classification Search
CPC ........ F01D 25/00; F01D 25/24; F01D 25/246; F01D 5/00; F01D 5/02; F01D 5/022; F01D 5/22; F01D 5/24; F01D 5/26; F01D 5/28; F01D 5/288; F01D 1/34; F01D 9/00; F01D 9/02; F01D 9/04; F01D 11/00; F01D 11/001; F01D 11/08; F01D 11/127; F05D 2220/00; F05D 2220/32; F05D 2240/55
USPC ........................................................ 277/543
See application file for complete search history.

(56) References Cited

U.S. PATENT DOCUMENTS

| | | | |
|---|---|---|---|
| 10,443,450 B2 | 10/2019 | Wilson et al. | |
| 2007/0098546 A1* | 5/2007 | Cairo | .................... F01D 11/005 415/170.1 |
| 2008/0265513 A1* | 10/2008 | Justak | ................... F01D 11/025 277/301 |
| 2012/0308367 A1* | 12/2012 | Luczak | ................... F01D 11/12 415/173.1 |

* cited by examiner

SEAL SUPPORT STRUCTURE FOR A CIRCUMFERENTIAL SEAL OF A GAS TURBINE ENGINE

CROSS REFERENCE TO RELATED APPLICATIONS

This application is a divisional application of application Ser. No. 14/921,533 filed on Oct. 23, 2015, and further claims the benefit of U.S. Provisional Patent Application Ser. No. 62/068,290 filed Oct. 24, 2014, the entire contents of which are incorporated herein by reference thereto.

FIELD

The present disclosure relates to sealing components of a gas turbine engine and, in particular, a seal support structures for circumferential seals.

BACKGROUND

Gas turbine engine components are required to operate efficiently during engine operation and flight. Components within the gas turbine engine aid in protecting operation and allow for operation at a high speed. Engine components rotating at high speeds require even sealing in order to operate efficiently and also to reduce damage to the engine. However, rotation of engine components can create vibrations which may reduce the engine efficiency and cause engine wear. Accordingly, there is a need to provide components which minimize and/or limit vibration for a gas turbine engine.

BRIEF SUMMARY OF THE DISCLOSURE

Disclosed and claimed herein is a seal support structure for a circumferential seal of a gas turbine engine. One embodiment is directed to a seal support structure for a circumferential seal of a gas turbine engine, the seal support structure including an engine support structure including a first flange, a seal support including a second flange, wherein the seal support is configured to retain a circumferential seal, and a shoulder joining the engine support and seal support, wherein the shoulder offsets the engine support from the seal support and wherein the seal support structure is configured to dampen vibration to the circumferential seal.

In one embodiment, the engine support structure is configured for mounting to at least one mount of the gas turbine engine.

In one embodiment, at least one of the engine support, seal support and shoulder are configured to dampen radial vibration of the circumferential seal.

In one embodiment, at least one of the engine support, seal support and shoulder are configured to dampen shoe and beam vibration of the circumferential seal.

In one embodiment, the shoulder interfaces with each the engine support and the seal support with a bend.

In one embodiment, the support structure is configured to be constructed as a single element.

In one embodiment, an axis of the first flange is offset from an axis of the second flange by the shoulder.

In one embodiment, the seal support structure further includes dampening material associated with bends of the shoulder on at least one of an inner and outer surface of the shoulder.

In one embodiment, the seal support structure further includes a shell structure configured to provide dampening for the seal support structure.

In one embodiment, the seal support structure further includes a spring damper between inner and outer beams of the seal support structure.

Another embodiment is directed to a gas turbine engine including a rotating component, a seal for the rotating component, and a seal support structure for the circumferential seal, the seal support structure including an engine support structure including a first flange, a seal support including a second flange, wherein the seal support is configured to retain a circumferential seal, and a shoulder joining the engine support and seal support, wherein the shoulder offsets the engine support from the seal support and wherein the seal support structure is configured to dampen vibration to the circumferential seal.

In one embodiment, the engine support structure is configured for mounting to at least one mount of the gas turbine engine.

In one embodiment, at least one of the engine support, seal support and shoulder are configured to dampen radial vibration of the circumferential seal.

In one embodiment, at least one of the engine support, seal support and shoulder are configured to dampen shoe and beam vibration of the circumferential seal.

In one embodiment, the shoulder interfaces with each the engine support and the seal support with a bend.

In one embodiment, the support structure is configured to be constructed as a single element.

In one embodiment, the circumferential seal is at least one of a full ring and segmented ring.

In one embodiment, the seal support structure of the gas turbine engine further includes dampening material associated with bends of the shoulder on at least one of an inner and outer surface of the shoulder.

In one embodiment, the seal support structure of the gas turbine engine further includes a shell structure configured to provide dampening for the seal support structure.

In one embodiment, the seal support structure of the gas turbine engine further includes a spring damper between inner and outer beams of the seal support structure.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE DISCLOSURE

Overview and Terminology

One aspect of this disclosure relates to components for a gas turbine engine, and in particular a seal support structure for a circumferential seal. A circumferential seal provides a continuous seal around rotating components of a gas turbine engine. A seal support structure is mounted to a stationary mount of the engine and configured to interface with a circumferential seal. A seal support structure is provided that may be configured to dampen vibration generated by a gas turbine engine. According to one or more embodiments, a seal support structure is provided to disassociate a circumferential seal from engine vibrations. Accordingly to another embodiment, a seal support structure is provided to isolate and/or reduce the effect of vibrations generated by a gas turbine engine on a circumferential seal.

Configurations are provided for a seal support structure and one or more dampening elements. Dampening as described herein can be provided by one or more of a seal support structure, an offset of a seal structure, a secondary shell unit, and damper elements. By way of example, according to one or more embodiments, a seal support structure may be provided with one or more support elements for mounting a seal assembly and a shell damper to the seal support structure, the damper configured to reduce vibrations of the gas turbine engine to a seal assembly.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1A:
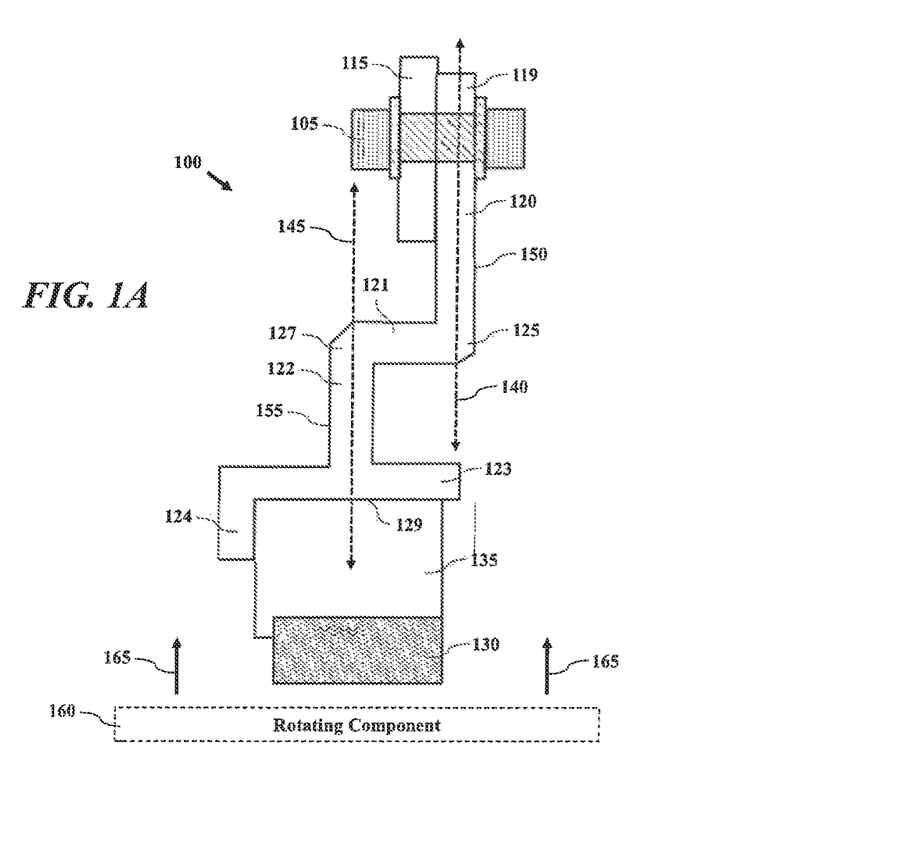
FIG. 1A depicts a cross-sectional representation of a seal support structure for a circumferential seal of a gas turbine engine according to one or more embodiments.
Figure 1B:
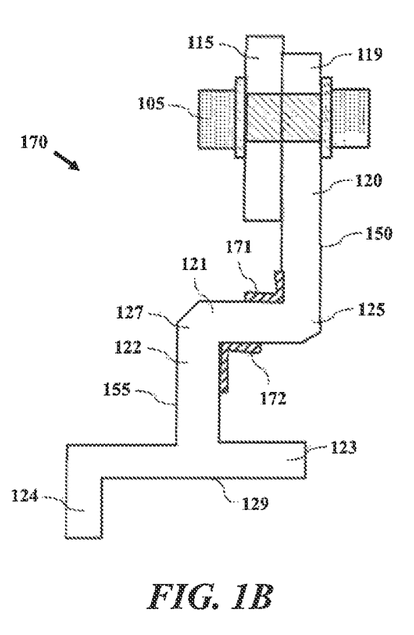
FIG. 1B depicts a cross-sectional representation of a seal support structure for a circumferential seal of a gas turbine engine according to one or more other embodiments.
Figure 1C:
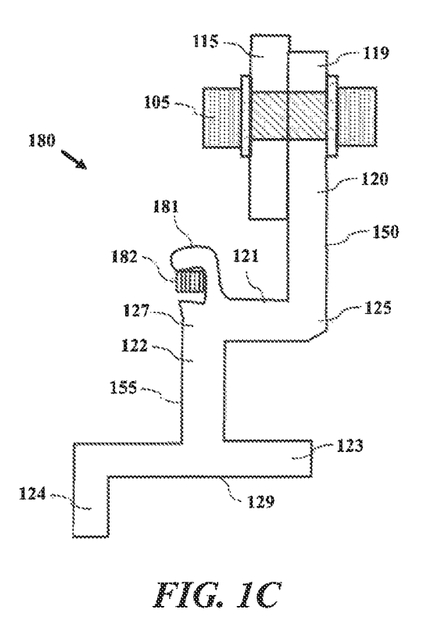
FIG. 1C depicts a cross-sectional representation of a seal support structure for a circumferential seal of a gas turbine engine according to one or more other embodiments.

Referring now to the figures, FIGS. 1A-1C depict seal support structures according to one or more embodiments. FIG. 1A depicts a cross-sectional representation of a seal support structure for a circumferential seal of a gas turbine engine. According to one embodiment, a seal support structure 100 includes an engine support structure 120 that includes a first flange 150, a seal support 122 that includes a second flange 155 where the seal support 122 retains a circumferential seal, and a shoulder 121 joining the engine support 120 and seal support 122. Shoulder 121 offsets engine support 120 from the seal support 122. Seal support structure 100 is configured to dampen vibration for the circumferential seal 135.

Engine support structure 120 includes a first flange 150. First flange 150 is a projecting rim, collar, or ring on a shaft, pipe or machine housing. First flange 150 is cast or formed to give additional strength, stiffness, or supporting area, or to provide a place for the attachment of other objects. First flange 150 has a central axis, shown as 140, that is offset from a central axis 145 of a seal support 122. Engine support 120 is configured for mounting to at least one mount of a gas turbine engine. First flange 150 extends between engine mount 115 and bend 125 of shoulder 121. Engine mount side 119 can have an attachment point where a fastening device 105 secures the engine support structure 120 to engine mount 115. Bend 125 is between engine support structure 120 and shoulder 121. Bend 125 can be curved or angled to dampen vibration, such as radial vibration. Support structure 100 may dampen at least one of shoe and beam vibration of the circumferential seal 135, and/or isolate/dampen circumferential seal 135 from vibration of a gas turbine engine.

The seal support 122 is configured to retain a circumferential seal 135. Seal support 122 includes second flange 155. Second flange 155 is a projecting rim. A central axis, shown as 145, of seal support 122 is offset from central axis 140 of engine support 120. Seal support 122 includes a bend 127 with shoulder 121, a runner 123, and runner arm 124. Second flange 155 extends between bend 127 and runner 123. Runner 123 includes seal mount surface 129 to engage with circumferential seal 135. The circumferential seal 135 is mounted to runner 123 and runner arm 124. Runner 123 extends perpendicular from second flange 155. Runner arm 124 extends radially from shoulder 121. Seal mount surface 129 is configured to include a runner 123 and runner arm 124. Runner 123 and runner arm 124 can cover a portion of the circumferential seal 135 outer surface. Seal mount surface 129 can be joined to circumferential seal 135 by pins or runner arm 124 projections.

Shoulder 121 joins engine support 120 and seal support 122. The shoulder 121 offsets the engine support 120 from the seal support 122. While described as separate elements, shoulder 121, engine support 120, and seal support 122 are formed as a uniform structure. Shoulder 121 and runner 123 are substantially parallel. Shoulder 121 offsets seal center axis to be aligned with center axis 145 of seal support 122. Shoulder 121, engine support 120, and seal support 122 are constructed of same material and thickness. Bend 125 of engine support structure 120 joins shoulder 121. Bend 127 of seal support 122 joins shoulder 121. Bend 125 and bend 127 can be curved or angled to dampen vibration, such as radial vibration 165.

Circumferential seal 135 includes a seal shoe 130, and configured to maintain a continuous seal on a rotating component 160. Rotating component 160 can be a shaft or other gas turbine engine component. Rotating component 160 circumferentially rotates between circumferential seal 135. According to one embodiment, one or more of bends 125 and 127 of seal support structure 100 may be configured to dampen vibration from one or more engine components to circumferential seal 135. In an exemplary embodiment, the magnitude of angularity of bends 125 and 127 can soften and/or stiffen engine load on circumferential seal 135 to enable seal compliance. In certain embodiments, seal support structure 100 may dampen radial vibration 165 traveling to or from rotating component 160. Support structure 100 can dampen vibration to and from circumferential seal 135 to improve at least one of shoe and beam response of circumferential seal 135.

FIG. 1B depicts a cross-sectional representation of a seal support structure for a circumferential seal of a gas turbine engine according to one or more other embodiments. Seal support structure 170 depicts another embodiment of the seal support of FIG. 1A. Seal support structure 170 includes a first flange 150, a seal support 122, and a shoulder 121 joining the engine support 120 and seal support 122. Shoulder 121 offsets engine support 120 from the seal support 122. According to one embodiment, shoulder 121 includes dampening material 171 and dampening material 172.

Dampening material 171 and 172 may be installed relative to bends 125 and 127 respectively. In one embodiment, dampening material 171 and 172 may be provided in the form of a viscoelastic material. According to another embodiment, dampening material 171 and 172 may be provided around the circumference of shoulder 121. In certain embodiments, dampening material 171 and 172 may be provided in particular locations of shoulder 121. Dampening material 171 and 172 may be configured to absorb vibration and provide dampening in addition to, or separate from, the dampening provided by the offset seal structure of seal support structure 170. Dampening material 171 and 172 may be configured to dampen vibration of other white noise traveling to a seal assembly from other parts of a gas turbine engine.

According to one embodiment, dampening material 171 and 172 may be one of visco-elastic rubber-type products for low temperature environments, and silicone based rubbers for higher temperature environments, such as temperatures up to 450-500 degrees F. (e.g., 230-260 C). For applications where temperature exceeds 500 degrees F. (e.g., 260 C), the materials of dampening material 171 and 172 may not function as true visco-elastic materials, but instead act as a loose-fill friction damper. According to another embodiment, dampening material as described herein, such as dampening material 171 and 172, may be a damper devise filled with loose granular material that would create dampening through internal motion and subsequent frictional heating due to internal relative motion of the particles. By way of example, dampening material 171 and 172 may be similar to a container of granules, the dampening material and granules capable of withstanding high temperatures of a gas turbine engine.

FIG. 1C depicts a cross-sectional representation of a seal support structure for a circumferential seal of a gas turbine engine according to one or more other embodiments. Seal support structure 180 depicts another embodiment of the seal support of FIG. 1A. Seal support structure 180 includes a first flange 150, a seal support 122, and a shoulder 121 joining the engine support 120 and seal support 122. Shoulder 121 offsets engine support 120 from the seal support 122. According to one embodiment, shoulder 121 includes structure 181 to retain a dampening element 182. Structure 181 may be a channel within a raised portion of the shoulder 121 to receive and retain dampening element 181. In one embodiment, dampening element 182 may be a spilt ring. In another embodiment, dampening element 182 may be a full ring damper. Dampening element 182 may be configured to fit within the channel of structure 181 and may extend the full circumference of the seal support structure 180. Dampening element 182 may be installed relative to shoulder 121 and may be configured to absorb vibration and provide dampening in addition to or separate from the dampening provided by the offset seal structure of seal support structure 180.

Figure 2:
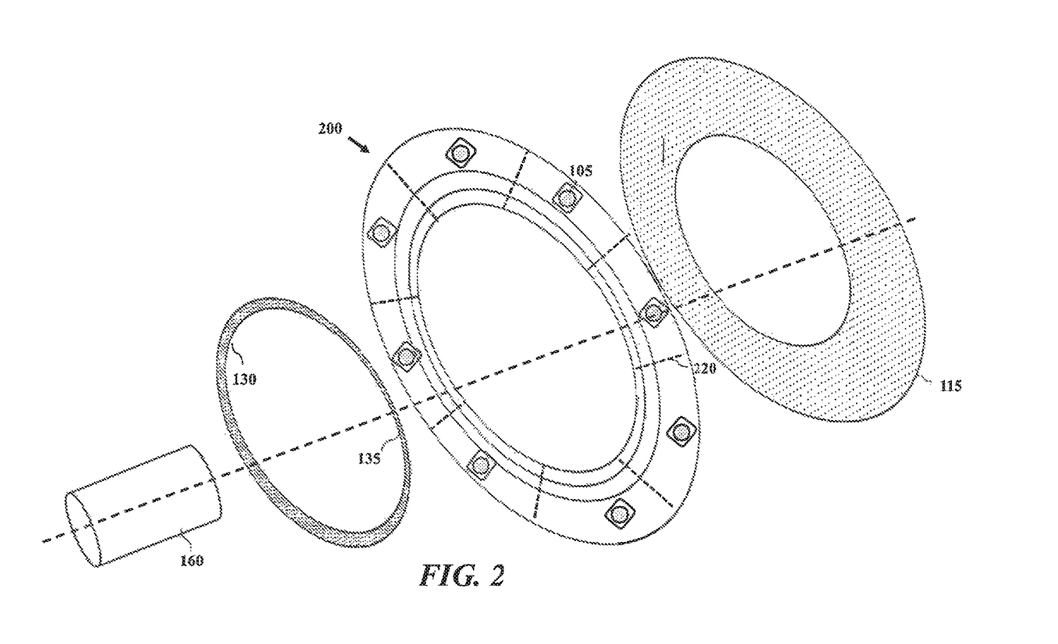
FIG. 2 depicts a three dimensional graphical representation of a seal support structure for a circumferential seal according to one or more embodiments.

FIG. 2 depicts a three dimensional graphical representation a seal support structure for a circumferential seal according to one or more embodiments. According to one embodiment, a seal support structure 200 is a full ring support structure for circumferential seal 135. Circumferential seal 135 including a seal shoe 130 configured to maintain a constant seal on a rotating counterpart 160. Circumferential seal 135 mounted to seal support structure 200 is at least one of a full ring and segmented seal. As a segmented seal, circumferential seal 135 may be configured as divided in equal or unequal segments, shown as 220, and joined together to maintain a continuous seal for rotating component 160. Seal support structure 200 is mounted to engine mount 115.

Figure 3:
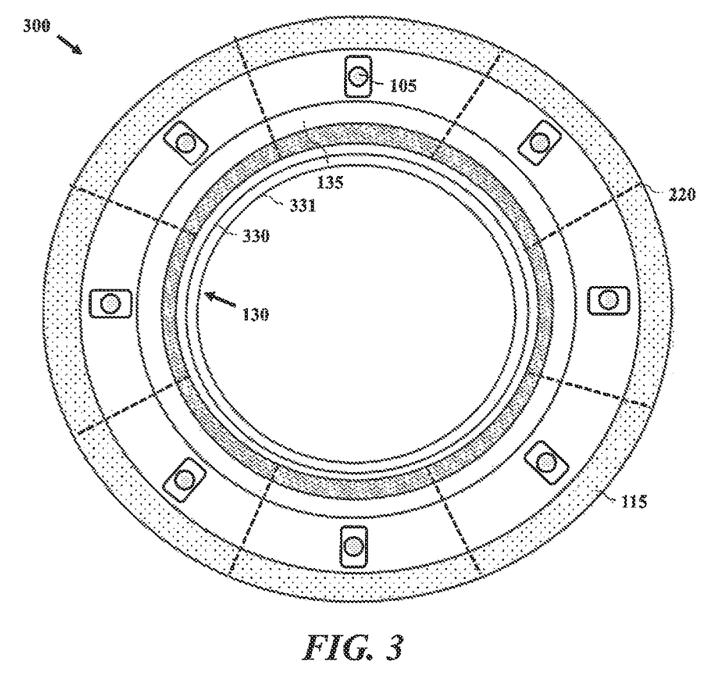
FIG. 3 depicts a top-down graphical representation of a seal support structure for a circumferential seal according to one or more embodiments.

FIG. 3 depicts a top-down graphical representation of a seal support structure for a circumferential seal according to one or more embodiments. According to one embodiment, a seal support structure 300 for a circumferential seal 135. Circumferential seal 135 is at least one of a full ring or segmented ring. Circumferential seal 135 includes beam 330 and shoe 331. Seal 135 can be a Halo™ seal by ATGI or labyrinth seal. Seal support structure 300 dampens vibration of circumferential seal 135. Seal support structure 300 is mounted to engine mount 115.

Figure 4:
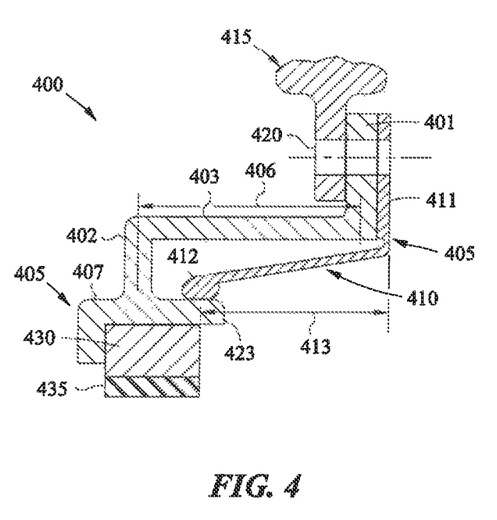
FIG. 4 depicts a cross-sectional representation of a seal support structure for a circumferential seal of a gas turbine engine according to one or more other embodiments.

FIG. 4 depicts a cross-sectional representation of a seal support structure for a circumferential seal of a gas turbine engine according to one or more other embodiments. According to one embodiment, a seal support structure 400 includes a first flange 401, a second flange 402, shoulder 406 and seal support 405. First flange 401 may be an engine support structure. Seal support 405 retains a circumferential seal 430 having seal shoe 435, and a shoulder 406 joins first flange 401, a second flange 402. Shoulder 406 offsets first flange 401 from second flange 402. First flange 401 may be configured to mount seal support structure 400 to engine support mount 415 via securing means 420 (e.g., bolt, pin, etc.). Seal support structure 400 includes a first flange 401 offset from second flange 402 by a distance 406. Distance 406 may provide thermal isolation. Offset distance 406 can also allow for installation of shell structure 410.

According to another embodiment, seal support structure 400 includes a shell structure 410 configured to interoperate with first flange 401, a second flange 402, shoulder 406 and seal support 405 to dampen vibration. According to one embodiment, shell structure 410 is a frictional damper. Shell structure 410 may be one of a full hoop damper element and a scalloped element. Shell structure 410 includes a flange portion 411 for mounting to first flange 401, and tip 412 offset from flange 411 by distance 413, the tip 412 configured to provide an interference fit with runner 423 of shoulder 407. The radial interference of tip 412 with runner 423 generates a radial load to stiffen seal support structure 400.

In certain embodiments, shell structure 410 may be configured to absorb vibration and provide dampening in addition to and/or separate from the dampening provided by the offset structure of seal support structure 400. Shell structure 410 may be configured to dampen vibration of other white noise traveling to a seal assembly from other parts of a gas turbine engine.

Figure 5A:
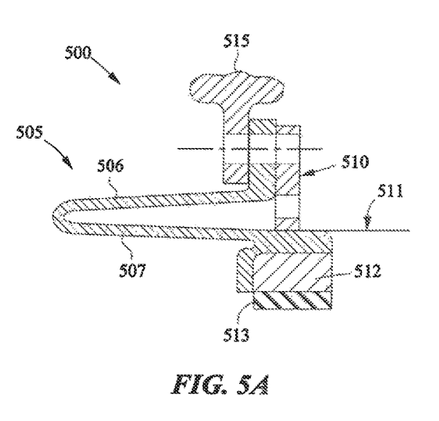
FIG. 5A depicts a cross-sectional representation of a seal support structure for a circumferential seal of a gas turbine engine according to one or more other embodiments.
Figure 5B:
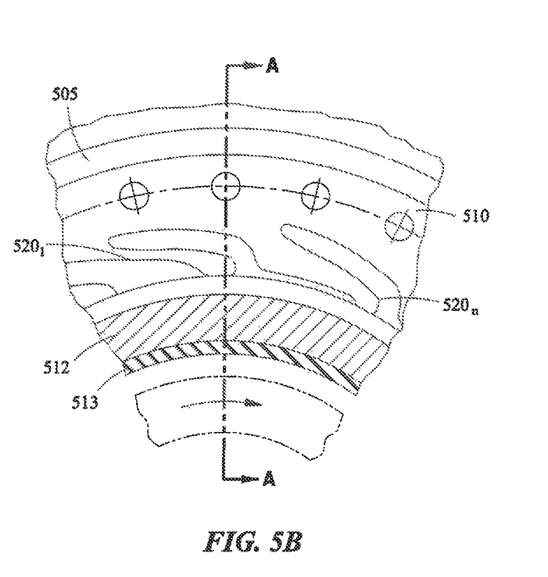
FIG. 5B depicts a seal element for a circumferential seal of a gas turbine engine according to one or more embodiments.

FIGS. 5A-5B depict graphical representations of a circumferential seal structure according to one or more embodiments. FIG. 5A depicts a cross-sectional representation of a seal support structure 500 for a circumferential seal of a gas turbine engine according to one or more other embodiments. Seal support structure 500 includes double axial shell case 505 configured to mount to engine mount 515 and to support circumferential seal 512 having shoe 513. According to one embodiment, shell case 505 is configured to interoperate with dampening element 510.

Shell case 505 includes an outer beam 506 and inner beam 507 to form an axial shell case. Outer beam 506 is separated from inner beam 507 to provide thermal isolation and softness to allow for dampening. Shell case 505 retains circumferential seal 512 below dampening element 510.

FIG. 5B depicts dampening element 510 for seal support structure 500 according to one or more embodiments. Dampening element 510 is configured to provide a plurality of extensions or fingers $520_{1-n}$ onto shell case 505. Fingers $520_{1-n}$ are configured to push onto shell case 505 to act as a friction damper. In certain embodiments, seal support structure 500 and dampening element 510 may be configured to absorb vibration and provide dampening of vibration or other white noise traveling to a seal assembly from other parts of a gas turbine engine.

Figure 6A:
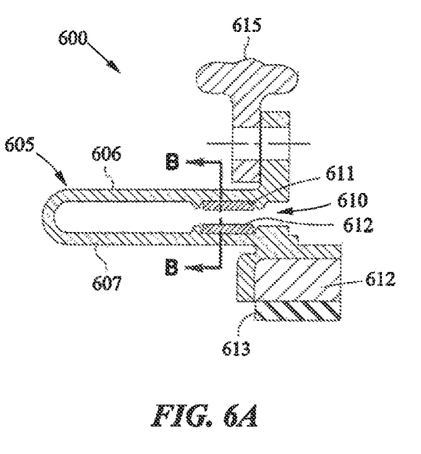
FIG. 6A depicts a cross-sectional representation of a seal support structure for a circumferential seal of a gas turbine engine according to one or more other embodiments.
Figure 6B:
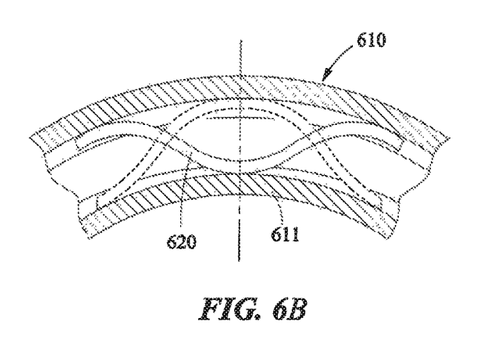
FIG. 6B depicts a seal element for a circumferential seal of a gas turbine engine according to one or more embodiments.

FIGS. 6A-6B depict graphical representations of a circumferential seal structure according to one or more embodiments. FIG. 6A depicts a cross-sectional representation of a seal support structure 600 for a circumferential seal of a gas turbine engine according to one or more other embodiments. Seal support structure 600 includes double axial shell case 605 configured to mount to engine mount 615 and to support circumferential seal 612 having shoe 613. According to one embodiment, shell case 605 is configured to interoperate with dampening element 610.

Shell case 605 includes an outer beam 606 and inner beam 607 to form an axial shell case. Outer beam 606 is separated from inner beam 607 to provide thermal isolation and softness to allow for dampening. Shell case 605 retains circumferential seal 612 below engine mount 615. Dampening element 610 is configured to be placed between outer beam 606 and inner beam 607. Dampening element 610 includes outer beam 611 and inner beam 612 which may be configured to retain a spring damper.

FIG. 6B depicts dampening element 610 for seal support structure 600 according to one or more embodiments. Dampening element 610 is shown in FIG. 6B along the lines B-B of FIG. 6A. Dampening element 610 includes outer beam 611 and inner beam 612 which may be configured to retain spring damper 620. Spring damper 620 may be configured as a wave spring dampen configured allow for deformation of outer beam 611 relative to inner beam 612. In certain embodiments, seal support structure 600 and dampening element 610 may be configured to absorb vibration and provide dampening of vibration of other white noise traveling to a seal assembly from other parts of a gas turbine engine.

Figure 7A:
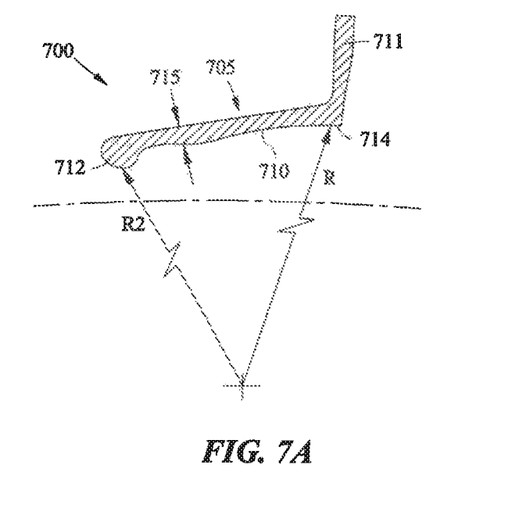
FIG. 7A depicts a cross-sectional representation of a damper element of seal support structure for a circumferential seal of a gas turbine engine according to one or more other embodiments.
Figure 7B:
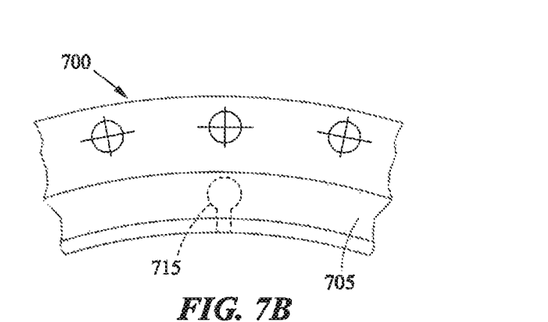
FIG. 7B depicts a seal element for a circumferential seal of a gas turbine engine according to one or more embodiments.
Figure 7C:
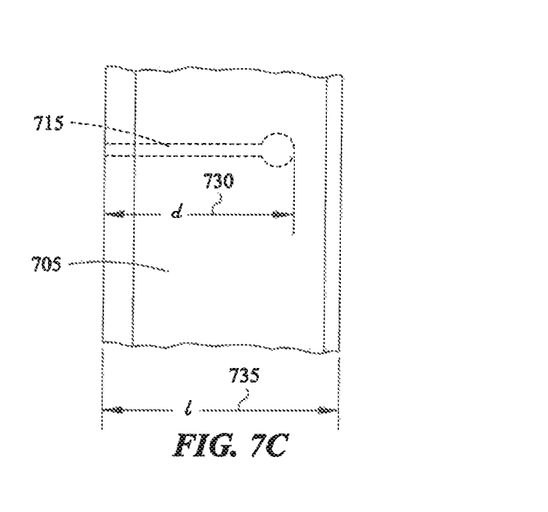
FIG. 7C depicts a seal element for a circumferential seal of a gas turbine engine according to one or more embodiments.

FIGS. 7A-7C depict a damper element according to one or more embodiments. FIG. 7A depicts a cross-sectional representation of a damper element of seal support structure for a circumferential seal of a gas turbine engine according to one or more other embodiments. According to one embodiment, a damper element 700 (e.g., damper element 400) may be a shell structure configured to integrate with a circumferential seal support (e.g., seal support structure 400).

According to one embodiment, damper element 700 may be provided as a cylindrical element of a certain length configured to provide a desired flexibility. Damper element 700 is a frictional damper. Damper element 700 may be one of a full hoop damper element and a scalloped element. Damper element 700 includes a flange portion 711 for mounting to a seal support structure (e.g., first flange 401), hoop portion 710 having outer surface 705, and tip 712 offset from flange 711, the tip 712 configured to provide an interference fit with a runner (e.g., runner 423) of a seal structure. The radial interference of tip 712 with a runner generates a radial load to stiffen a seal support structure having a radius shown as 714. The configuration of damper element 700 may provide a radial softness for a seal structural element.

In certain embodiments, damper element 700 may be configured to absorb vibration and provide dampening in addition to and/or separate from the dampening provided by the offset structure of a seal support structure. Damper element 700 may be configured to dampen vibration of other white noise traveling to a seal assembly from other parts of a gas turbine engine.

FIG. 7B depicts a partial representation of damper element 700 seal element for a circumferential seal of a gas turbine engine according to one or more embodiments. According to one embodiment, hoop 710 may optionally include one of more keyhole slots 715 to soften the hoop and bending stiffness to provide a desired damping response.

FIG. 7C depicts a representation of hoop element 710 according to one or more embodiments. Hoop element 710 includes an optional key hole 715 which may extend a depth 730 across hoop 710 having a length 735. According to another embodiment, one or more features of damper element 700 may be tailored to provide a particular dampening response. Variables for tailoring dampening characteristics of damper element 700 may include one or more of the quantity of damper elements, the length 735, depth 735, thickness of hoop 710, and radius 714. The material of hoop element 710 may also provide a particular stiffness. According to another embodiment, tip 712 may be configured to provide an interference fit with a runner of a seal structure (e.g., shoulder 407) to set a pre-load force for dampening.

While this disclosure has been particularly shown and described with references to exemplary embodiments thereof, it will be understood by those skilled in the art that various changes in form and details may be made therein without departing from the scope of the claimed embodiments.

What is claimed is:

1. A seal support structure for a circumferential seal of a gas turbine engine, the seal support structure comprising:
a first flange located at a first end of the seal support structure and configured to mount to an engine mount;
a seal support located at a second end of the seal support structure, the seal support is configured to retain a circumferential seal;
a second flange extending radially outwardly from the seal support;
a shoulder connecting the first flange to the second flange, wherein the shoulder axially offsets the second flange from the first flange, and wherein the seal support structure is configured to dampen vibration to the circumferential seal;
a shell structure configured to provide dampening for the seal support structure, the shell structure having a first end secured to the first flange and a second end having a radial interference fit with the seal support.

2. The seal support structure of claim 1, wherein at least one of the first flange, seal support and shoulder are configured to dampen radial vibration of the circumferential seal.

3. The seal support structure of claim 1, wherein at least one of the first flange, seal support and shoulder are configured to dampen shoe vibration of the circumferential seal.

4. The seal support structure of claim 1, wherein the shoulder interfaces with each the first flange and the second flange with a bend.

5. The seal support structure of claim 1, wherein the seal support structure is configured to be constructed as a single element.

6. The seal support structure of claim 1, wherein an axis of the first flange is offset from an axis of the second flange by the shoulder.

7. A gas turbine engine comprising:
a rotating component;
a circumferential seal for the rotating component; and
a seal support structure for the circumferential seal, the seal support structure including:
a first flange located at a first end of the seal support structure and configured to mount to an engine mount;
a seal support located at a second end of the seal support structure, the seal support is configured to retain the circumferential seal;
a second flange extending radially outwardly from the seal support;
a shoulder connecting the first flange to the second flange, wherein the shoulder axially offsets the engine support second flange from the first flange, and wherein the seal support structure is configured to dampen vibration to the circumferential seal; and
a shell structure configured to provide dampening for the seal support structure, the shell structure having a first end secured to the first flange and a second end having a radial interference fit with the seal support.

8. The gas turbine engine of claim 7, wherein at least one of the first flange, seal support and shoulder are configured to dampen radial vibration of the circumferential seal.

9. The gas turbine engine of claim 7, wherein at least one of the first flange, seal support and shoulder are configured to dampen shoe vibration of the circumferential seal.

10. The gas turbine engine of claim 7, wherein the shoulder interfaces with each of the first flange and the second flange with a bend.

11. The gas turbine engine of claim 7, wherein the seal support structure is configured to be constructed as a single element.

12. The gas turbine engine of claim 7, wherein the circumferential seal is at least one of a full ring and segmented ring.

* * * * *